(12) United States Patent
Kamo et al.

(10) Patent No.: US 6,270,145 B1
(45) Date of Patent: Aug. 7, 2001

(54) CANVAS TOP ATTACHING STRUCTURE

(75) Inventors: Mitsuhiro Kamo; Noriyuki Sugihara, both of Hamamatsu (JP)

(73) Assignee: Suzuki Motor Corporation, Hamamatsu (JP)

( * ) Notice: Subject to any disclaimer, the term of this patent is extended or adjusted under 35 U.S.C. 154(b) by 0 days.

(21) Appl. No.: 09/352,883

(22) Filed: Jul. 13, 1999

(30) Foreign Application Priority Data

Jul. 14, 1998 (JP) .................................................. 10-198734

(51) Int. Cl.⁷ ........................................................ B60J 7/08
(52) U.S. Cl. ...................... 296/121; 296/107.04; 296/102
(58) Field of Search .............................. 296/121, 107.04, 296/102

(56) References Cited

U.S. PATENT DOCUMENTS 5,992,917 * 11/1999 Hilliard et al. .................. 296/121 X

FOREIGN PATENT DOCUMENTS

| 2 176 155 | * 12/1986 | (GB) | ..................................... 296/121 |
| 1-169428 | 11/1989 | (JP) | . |
| 1-169429 | 11/1989 | (JP) | . |
| 2-147318 | 12/1990 | (JP) | . |
| 4-31125 | 2/1992 | (JP) | . |
| 4-10102 | 3/1992 | (JP) | . |
| 8-132881 | 5/1996 | (JP) | . |

* cited by examiner

*Primary Examiner*—Joseph D. Pape
*Assistant Examiner*—Lori L. Coletta
(74) *Attorney, Agent, or Firm*—Finnegan, Henderson, Farabow, Garrett & Dunner, L.L.P.

(57) ABSTRACT

In order to prevent the entrance of water or other liquids into the inside of a canvas top, to prevent the occurrence of wrinkles and a positional shift at the time of assembling the canvas top, to prevent wind noise generated at the time of vehicle running, and to increase the work efficiency for assembling the canvas top, a flap 11 provided with a hook 10 is attached to the rear end portion (a canvas 6*a* of a depending portion 6 of a top deck 7) of a canvas covering an open portion 3 of an automobile, and the rear end portion 6*a* of the canvas is attached to a vehicle body in a state in which the hook 10 is engaged with an engagement portion (an engagement groove 17 in a garnish 15) provided on the vehicle body side.

2 Claims, 10 Drawing Sheets

CANVAS TOP ATTACHING STRUCTURE

FIELD OF THE INVENTION AND RELATED ART STATEMENT

The present invention relates to an attaching structure for a canvas top attached to a vehicle body to cover an open portion etc. on the rear side of an automobile. More particularly, it relates to a structure for fixing an end portion of a canvas top used for a four-wheeled automobile.

FIGS. 15 to 19 show a conventional canvas top attaching structure. In these figures, a canvas top 30 is attached to a rear portion R of a vehicle body to cover an open portion on the rear side of a four-wheeled automobile. This canvas top 30 is made up of a top deck (rear deck) 31 which covers an upper open portion on the rear side of the four-wheeled automobile and right and left corner portions at the rear end, a rear window 33 mounted to the top deck 31 using a fastener 32 (see FIG. 15) to cover an open portion formed at the rear of the top deck 31, and side windows (quarter windows) 34 mounted to the top deck 31 to cover an open portion formed at right and left side portions of the top deck 31.

Figure 15:
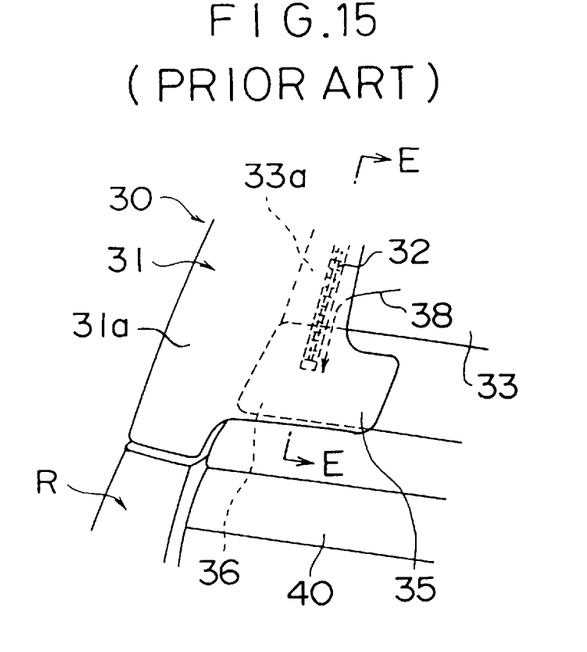
FIG. 15 is a perspective view of an attaching structure of the rear end portion of a conventional canvas top.
Figure 16:
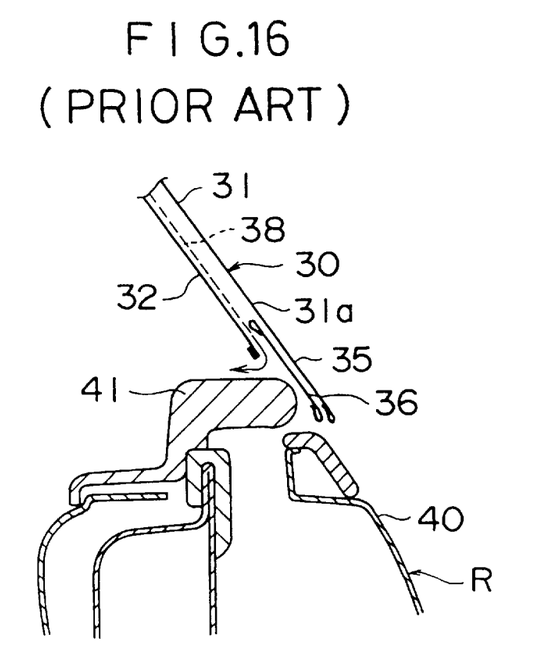
FIG. 16 is an enlarged sectional view taken along the line E—E of FIG. 15.
Figure 17:
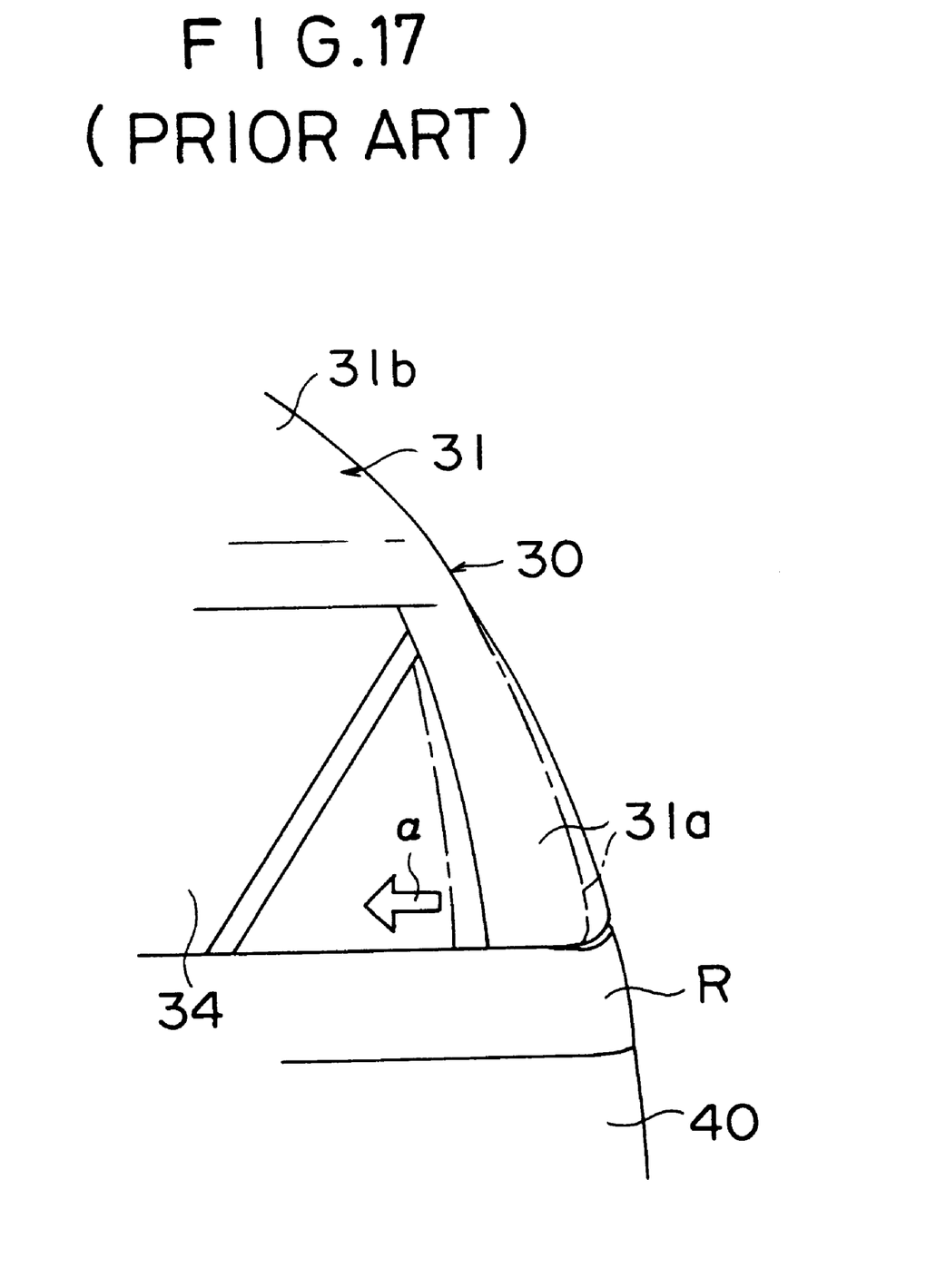
FIG. 17 is a side view showing a state in which a canvas of the canvas top rear end portion is pulled forward when the canvas top is assembled.

Conventionally, the top deck 31 and the rear window 33 are attached to each other at the rear end portion of the canvas top 30 as follows: A depending portions 31a depending at the right and left side portions on the rear end side of the top deck 31 and a right side portion (not shown) and a left side portion 33a of the rear window 33 are connected to each other using the fastener 32, and a canvas 35 at the lower end portion of the depending portion 31a (the lower portion at the rear end of the top deck 31) is lapped on the outside of a canvas 36 at the lower portion of the right and left side portions 33a of the rear window 33.

Figure 18:
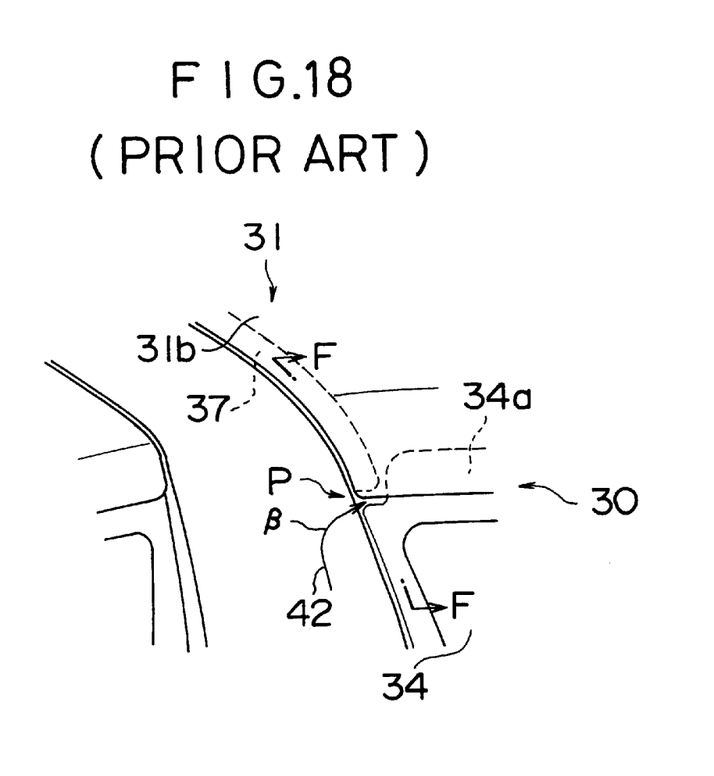
FIG. 18 is a perspective view of an attaching structure of the front end portion of the conventional canvas top.
Figure 19:
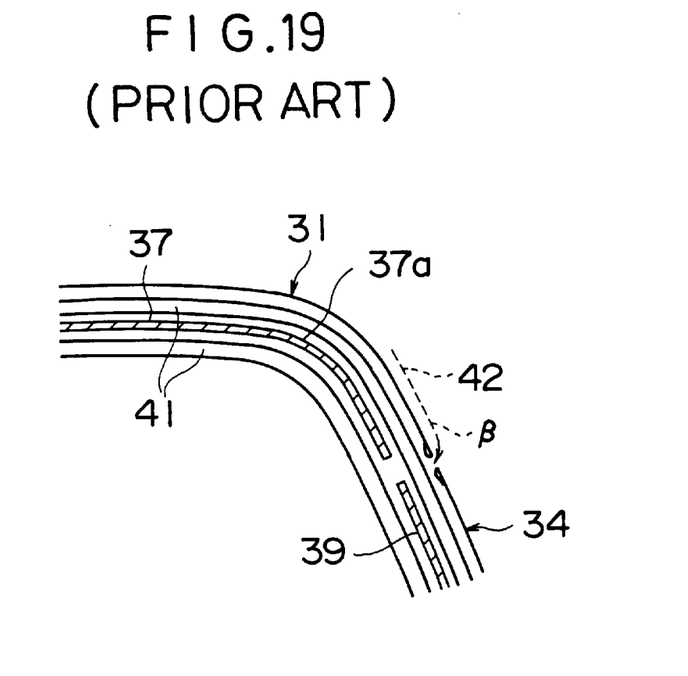
FIG. 19 is an enlarged sectional view taken along the line F—F of FIG. 18.

Also, a conventional structure for attaching the top deck 31 to the rear portion R of the vehicle body at the front end portion of the canvas top 30 is as follows: As shown in FIGS. 18 and 19, one retainer 37 extending lengthways along the front edge of the top deck 31 is attached to the front edge of the top deck 31, and the right and left end portions of the retainer 37 are extendedly provided so as to turn to the upper portion of the side window 34, that is, to the side portion of the vehicle body upper part. Thus, after the top deck 31 is mounted on the vehicle body, the side windows 34 are disposed at the sides of the top deck 31 and mounted to the vehicle rear part (not shown in FIGS. 18 and 19), and an upper edge 34a of the side window 34 is intruded to the back side of the top deck 31 mounted beforehand to the vehicle body rear side. In FIG. 19, reference numeral 39 denotes a retainer for attaching the front end portion of the side window 34.

However, the conventional canvas top attaching structure as described above has the following problems. First, regarding the attaching structure for the rear end portion of the canvas top 30, since the canvas 35 of the top deck 31 and the canvas 36 of the rear window 33 are lapped on each other, there arises a problem in that water 38 flowing down along the fastener 32 (see FIGS. 15 and 16) or water from the lower side of the vehicle body is liable to enter the cabin side through a gap between the canvas 36 and a garnish 41 above a rear gate 40. Also, since a ceiling portion 31b of the top deck 31 is subjected to a tension directed to the vehicle body front as indicated by the arrow mark α in FIG. 17 when the canvas top 30 (top deck 31) is assembled to the vehicle body rear portion R, there arises a problem in that the canvas top 30 is mounted in such a manner that the depending portion 31a of the top deck 31 is pulled toward the vehicle body front side and the rear end portion of the canvas top 30 is shifted forward as indicated by the dash-and-dot line in FIG. 17, and moreover wrinkles are produced on the canvas top 30.

Also, regarding the attaching structure for the front end portion of the canvas top 30, since only one retainer 37 is provided at the front edge of the top deck 31 and extends in series to a portion where it turns to the upper part of the side window 34, so that a corner portion 37a (see FIG. 19) at right and left end portions of the retainer 37 performs a function as a shape holding member at the right and left side portions of the top deck 31, it is actually difficult to perform work for intruding the upper edge 34a of the side window 34 to the back side of the top deck 31 mounted beforehand to the vehicle body rear portion R. Moreover, since even if the top deck 31 and the side window 34 are assembled to each other in a state in which the upper edge 34a of the side window 34 is intruded to the back side of the top deck 31, a gap is produced between the front end side portion of the ceding portion 31b of the top deck 31 and the front end upper portion of the side window 34 at a joining portion P of the top deck 31 and the side window 34 as shown in FIGS. 18 and 19, there is the possibility of water 42 or other liquids entering the cabin through a gap at the aforesaid joining portion P of the top deck 31 and the side window 34 as indicated by the arrow mark β.

OBJECT AND SUMMARY OF THE INVENTION

The present invention has been made to solve the above problems, and accordingly an object thereof is to provide a canvas top attaching structure which can prevent the entrance of water or other liquids into the inside of a canvas top, can prevent the occurrence of wrinkles and a positional shift at the time of assembling the canvas top, can prevent wind noise generated at the time of vehicle running, and can increase the work efficiency for assembling the canvas top.

To achieve the above object, in the present invention, a flap provided with a hook is attached to the rear end portion of a canvas covering an open portion of an automobile, and the rear end portion of the canvas is attached to a vehicle body in a state in which the hook is engaged with an engagement portion provided on the vehicle body side.

Also, in the present invention, the flap is disposed at a portion corresponding to a fastener provided at the rear end portion of the canvas.

Also, in the present invention, in a canvas top attaching structure having at least a top deck for covering an upper portion of an open portion of an automobile and side windows attached to the side of the top deck, in which a retainer attached to the front edge of a canvas constituting the top deck is engaged with a vehicle body to attach the top deck to the vehicle body, the retainer is divided at a portion corresponding to a joining portion of the top deck and the side window.

Also, in the present invention, when the side portion of the divided retainer is engaged with the vehicle body, the side portion at the front edge of a ceiling portion of the top deck and the upper end portion at the front edge of the side window are lapped on each other.

BRIEF DESCRIPTION OF THE DRAWINGS

FIG. 5 is a view of a hooked flap attached to the depending portion of the top deck, FIG. 5(A) being a perspective view of the hooked flap viewed from the top surface side, and FIG. 5(B) being a perspective view of the hooked flap viewed from the back surface side;

DETAILED DESCRIPTION OF PREFERRED EMBODIMENTS

One embodiment of the present invention will be described below with reference to FIGS. 1 to 14.

Figure 1:
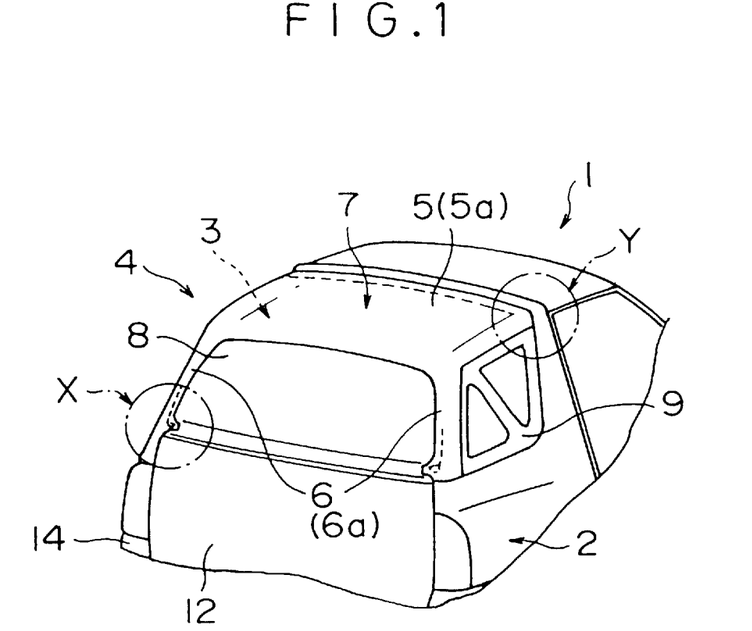
FIG. 1 is a perspective view of a rear part of a four-wheeled automobile equipped with a canvas top attaching structure in accordance with the present invention, showing a structure for attaching the canvas top rear portion to a vehicle body.
Figure 2:
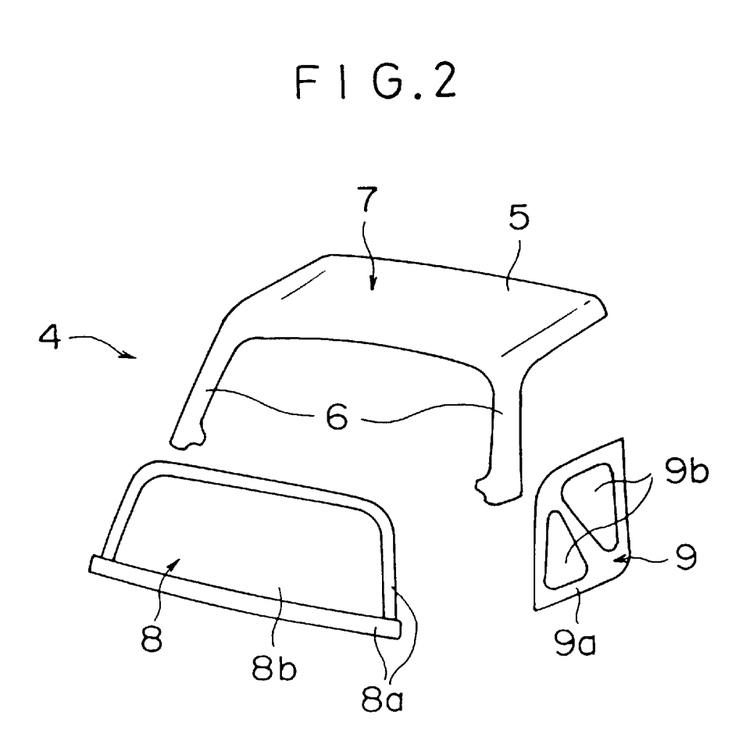
FIG. 2 is an exploded perspective view of the canvas top.

FIG. 1 shows a vehicle body rear part 2 of a four-wheeled automobile 1 equipped with a canvas top attaching structure in accordance with the present invention. On this four-wheeled automobile 1, an open portion 3 is provided at the upper rear portion of a vehicle body, and a canvas top 4 for covering the open portion 3 is detachably attached to the vehicle body. As shown in FIGS. 1 and 2, the canvas top 4 is made up of a top deck (rear deck) 7 consisting of a ceiling portion 5 and depending portions 6 depending from the rear ends of the ceiling portion 5, a rear window 8 assembled to the rear part of the top deck 7, and a pair of side windows (quarter windows) 9, right and left, assembled to the right and left side portions of the top deck 7. The top deck 7 consists of a canvas 5a constituting the ceiling portion 5 and canvases 6a constituting the depending portions 6, the rear window 8 consists of a canvas 8a and one transparent film 8b, and the side window 9 consists of a canvas 9a and two transparent films 9b.

Figure 3:
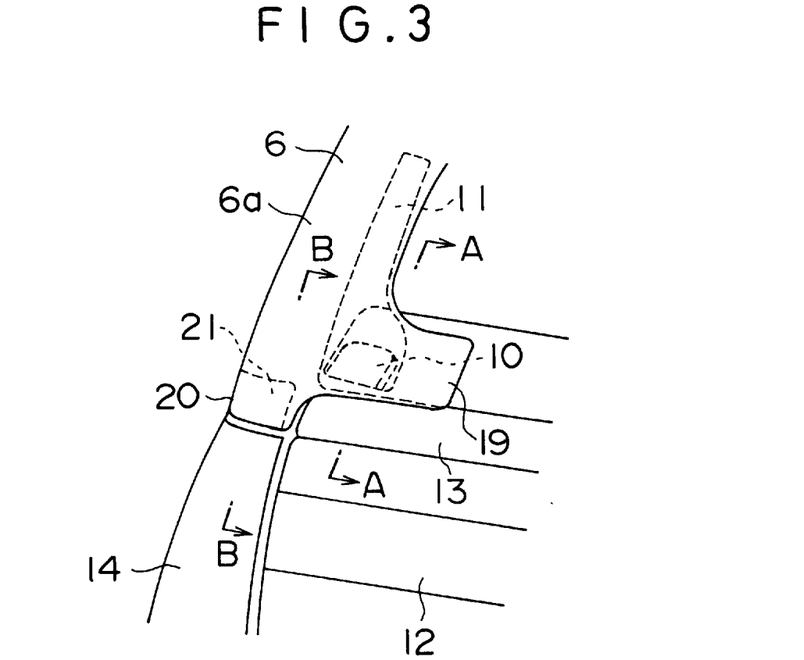
FIG. 3 is an enlarged perspective view of a portion indicated by the arrow mark X in FIG. 1, showing a structure for attaching the canvas top rear portion to a vehicle body.
Figure 4:
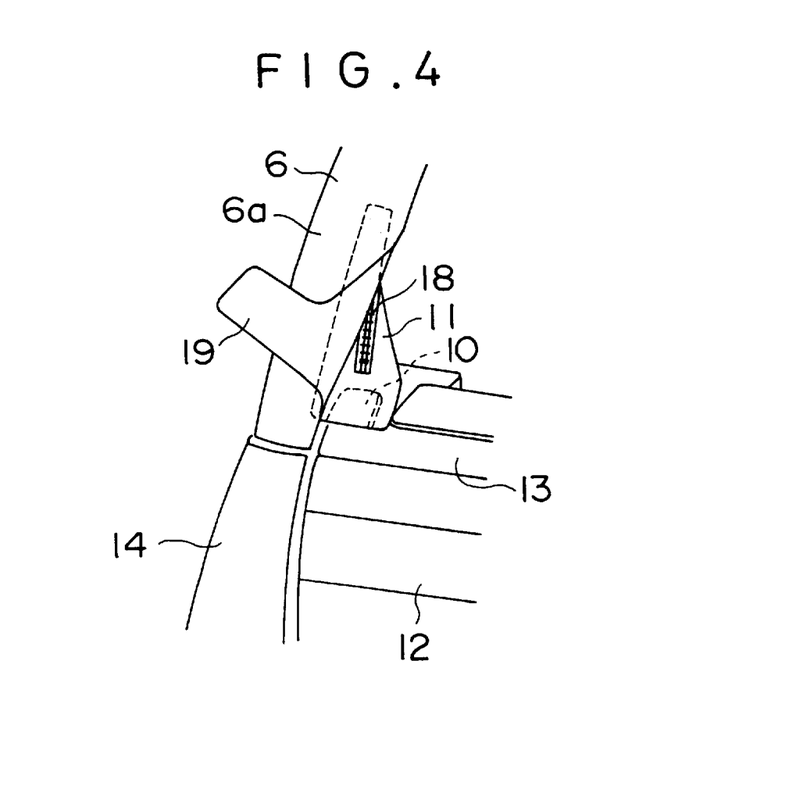
FIG. 4 is a perspective view similar to FIG. 3, showing a state in which a canvas of the depending portion of a top deck is turned over.
Figure 5A:
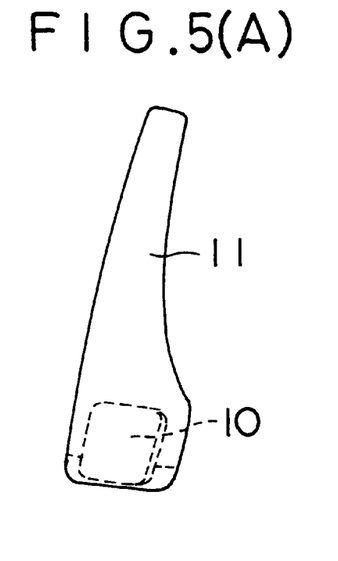
Figure 5B:
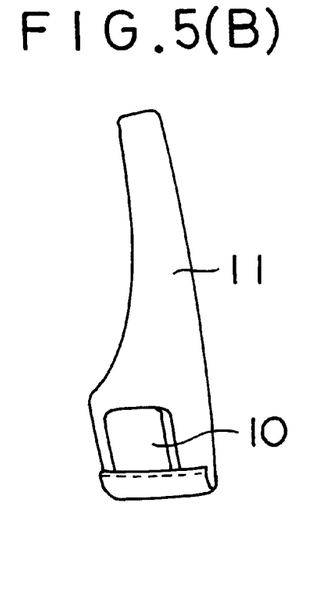

FIGS. 3 and 4 show a state in which the top deck 7 is attached to the vehicle body rear part 2. This state will be described in detail below. A flap 11 provided with a hook (engagement claw) 10 is attached to the back face (cabin-side face) at the lower end portion of the depending portion 6 of the top deck 7. The flap 11, which is made of a lengthwise cloth material extending vertically, is fitted with a plate-shaped hook 10, which is made of a synthetic resin or the like, on the back face side at the lower end portion of the flap 11 as shown in FIGS. 5(A) and 5(B). The upper edge of the flap 11 is attached to the canvas 6a constituting the depending portion 6 of the top deck 7 by means of sewing or the Like, and the hook 10 is hung in a free state via the flap 11.

Figure 6:
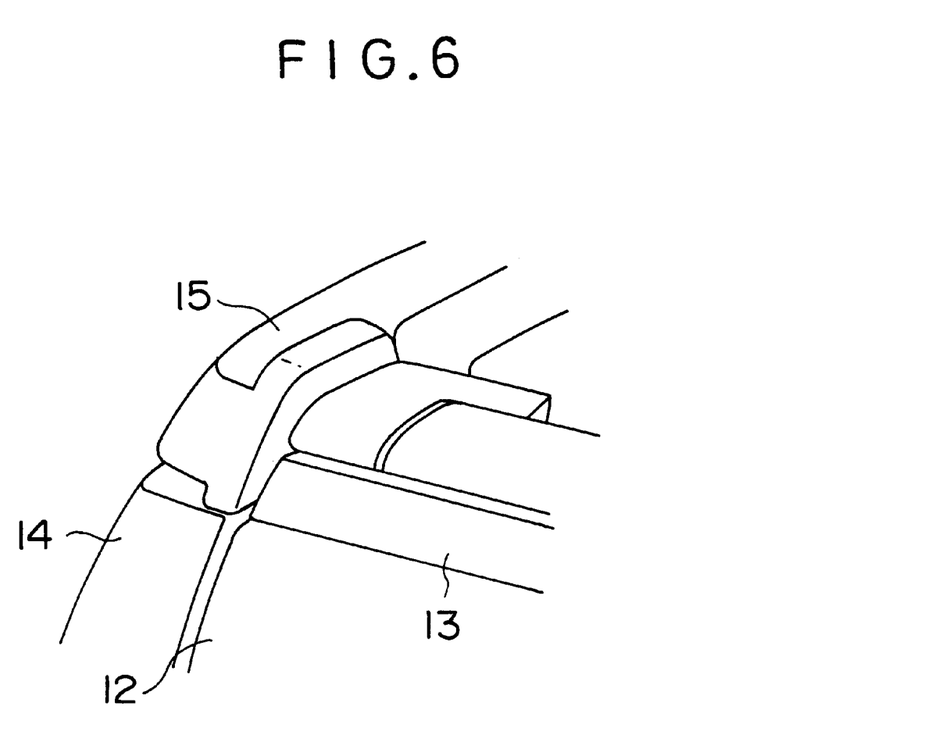
FIG. 6 is a perspective view of a vehicle body structure at the rear corner portion of an open portion to which the canvas top is attached.
Figure 7:
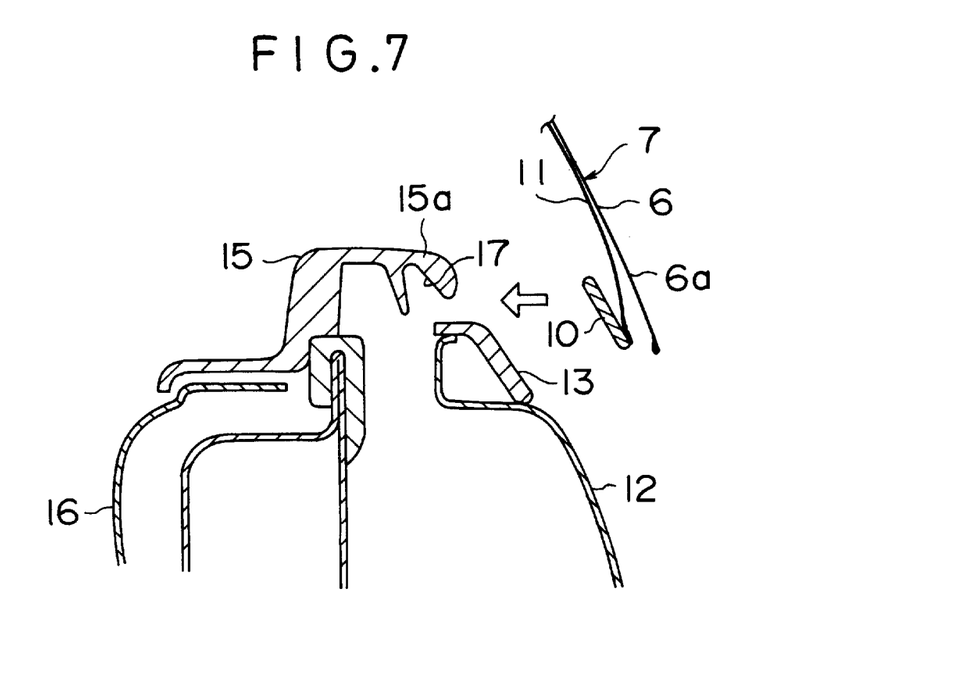
FIG. 7 is an enlarged sectional view taken along the line A—A of FIG. 3, showing a state before a hook is engaged.
Figure 8:
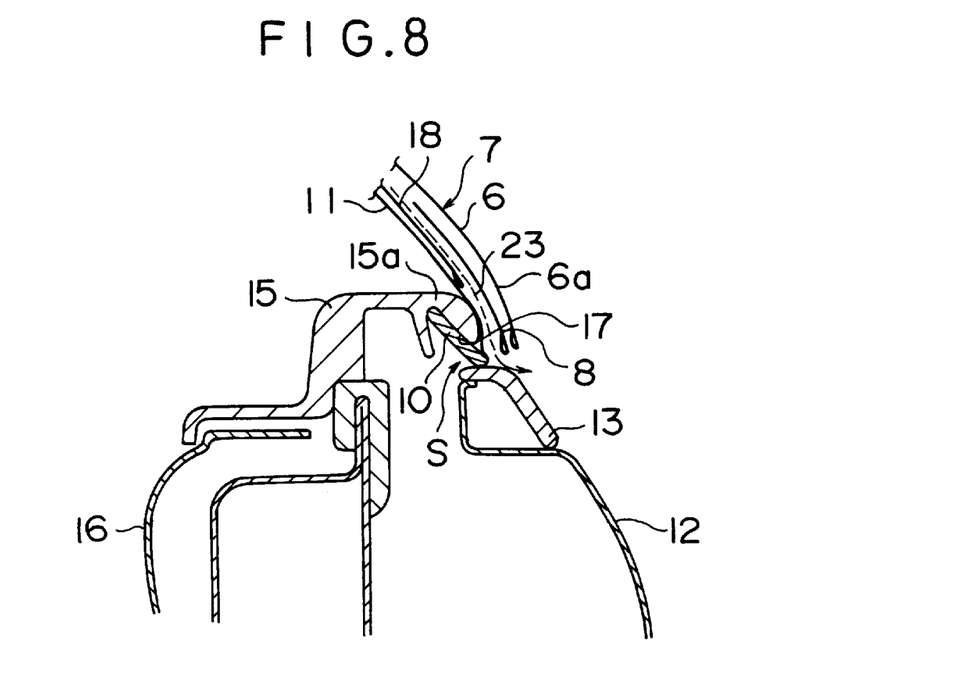
FIG. 8 is an enlarged sectional view taken along the line A—A of FIG. 3, showing a state after the hook is engaged.

On the other hand, above a rear gate 12 of the rear vehicle body 2 disposed so as to correspond to the lower portion of the rear window 8 of the canvas top 4 is mounted a gate filler 13, and a garnish 15 is disposed above a side body 14 constituting the side of the rear vehicle body 2 and the aforesaid gate filler 13. The garnish 15 covers and conceals the upper part of the cabin trim 16 and the gate filler 13 to improve the appearance (see FIGS. 6 to 8). Also, as shown in FIGS. 7 and 8, the garnish 15 is formed with an engagement groove (engagement portion) 17 for engaging the hook 10 with an outside tip end portion 15a corresponding to the upper portion of the gate filer 13.

Thus, by engaging the hook 10 with the engagement groove 17 formed in the garnish 15 on the vehicle body side, the lower end portion of the depending portion 6 of the top deck 7 is attached to the garnish 15 (vehicle body side) via the hook 10 and the flap 11, whereby the canvas 6a of the depending portion 6 of the top deck 7, which is the rear end portion of the canvas top 4, is attached to the vehicle body rear part 2. In this engagement state, as shown in FIG. 8, the hook 10 is folded to the upside from the lower end of the canvas 6a, and the lower end portion of canvas 6a wound on the hook 10 comes into contact with the gate filler 13.

Also, a fastener 18 is provided to connect the canvas 6a of the depending portion 6 of the top deck 7 to the side portion of the canvas 8a of the rear window 8. At a portion corresponding to the fastener 18 is disposed the flap 11. Further, at the lower end portion of the canvas 6a, a projection portion 19 is provided so as to project toward the vehicle body center as shown in FIGS. 3 and 4, and a surface fastener (not shown) is provided on the back surface of the projection portion 19. By engaging this surface fastener with a surface fastener (not shown) provided at the lower edge portion of the canvas 8a of the rear window 8, the lower end portion of the fastener 18 is covered and concealed by the projection portion 19.

Figure 9:
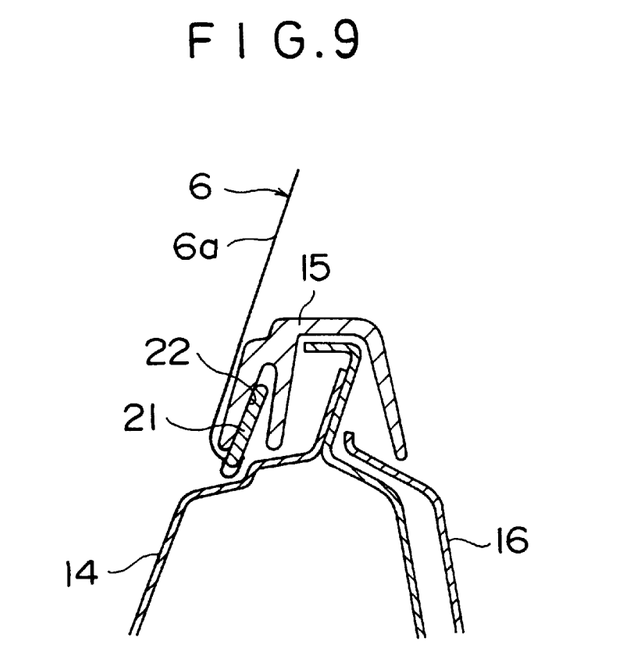
FIG. 9 is an enlarged sectional view taken along the line B—B of FIG. 3.
Figure 10:
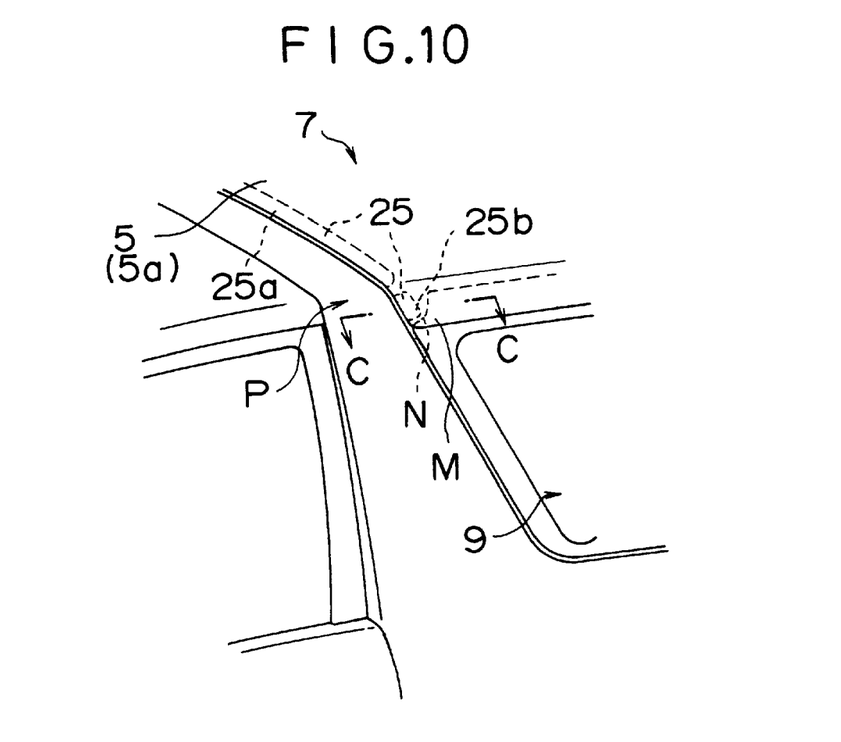
FIG. 10 is an enlarged perspective view of a portion indicated by the arrow mark Y in FIG. 1, showing a structure for attaching the front end portion to the vehicle body.
Figure 11:
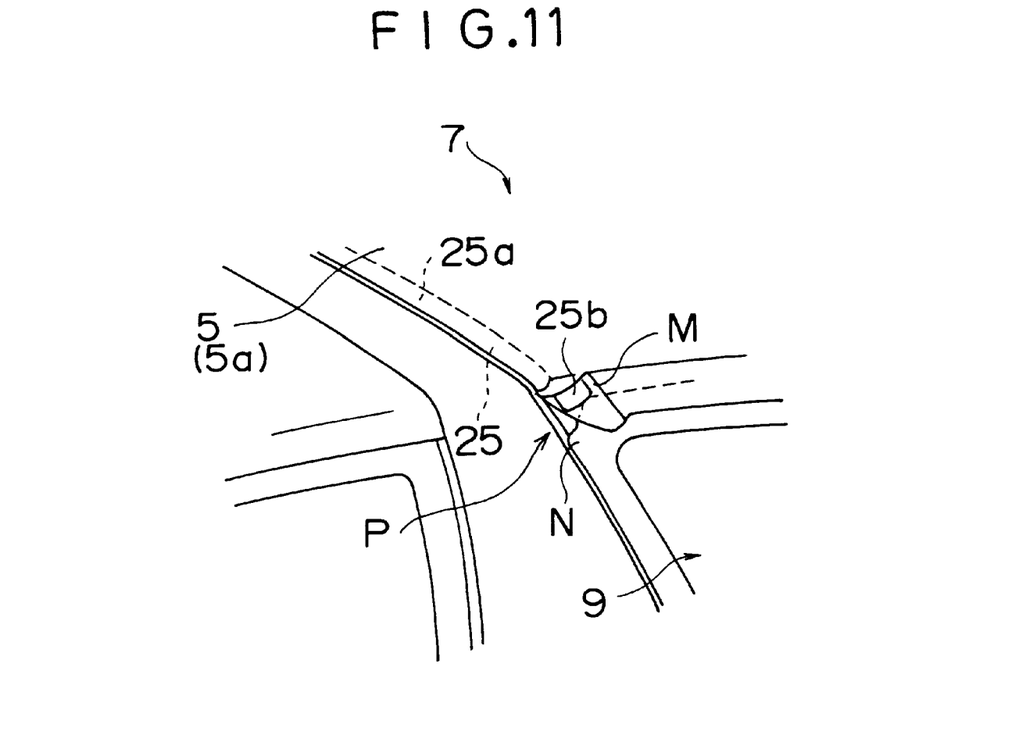
FIG. 11 is a perspective view similar to FIG. 10, showing a state in which a part of the front end portion of the top deck to which a divided retainer portion is attached is turned over.
Figure 12:
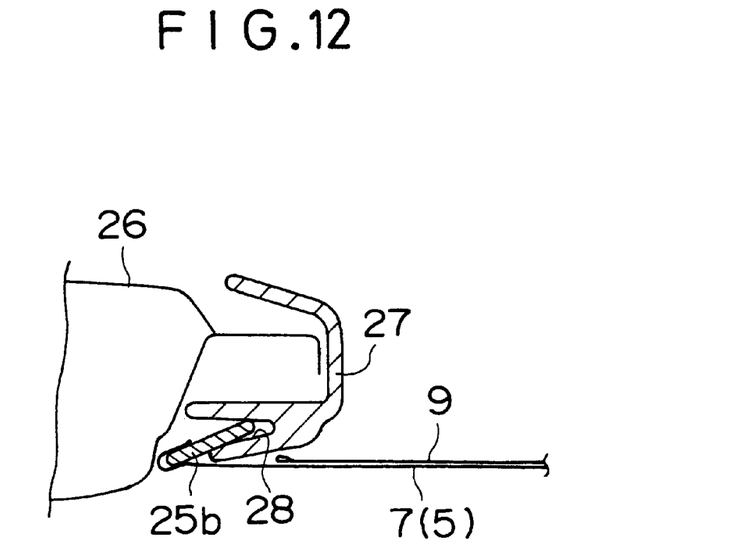
FIG. 12 is an enlarged sectional view taken along the line C—C of FIG. 10.
Figure 13:
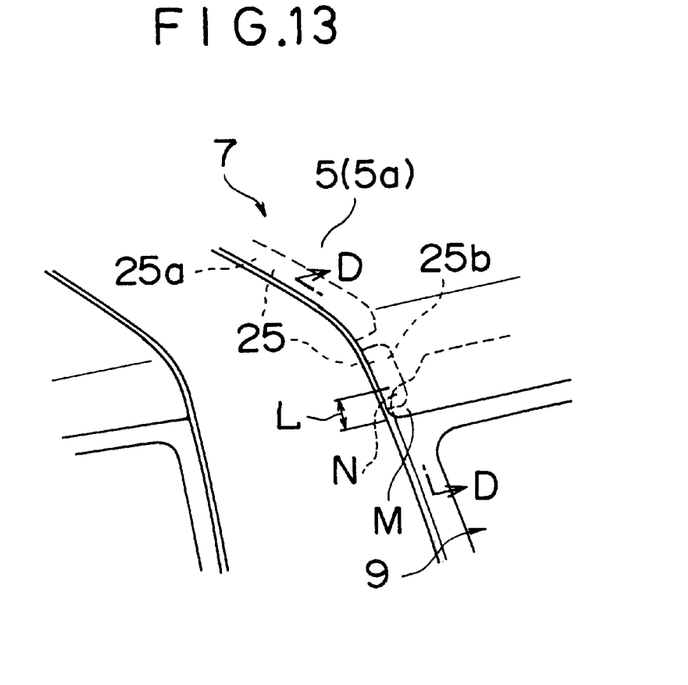
FIG. 13 is a perspective view similar to FIG. 10, showing a case where a lap length of the side portion of the ceiling portion of the top deck on the upper end portion of a side window is made large.

Further, as shown in FIGS. 3 and 9, a hook 21 is provided at a corner portion 20 of the rear end portion of the canvas top 4, and the lower end portion of the canvas 6a is attached to the vehicle body rear portion 2 in a state in which the hook 21 is engaged with an engagement groove 22 in the garnish 15 as shown in FIG. 9.

According to the attaching structure for the rear end portion of the canvas top 4, since the rear end portion of the canvas top 4 is attached to the vehicle body rear portion 2 by providing the flap 11 provided with the hook 10 on the canvas 6a and by engaging the hook 10 with the engagement groove 17 in the garnish 15, a passage from the vehicle outside to the vehicle inside at the attaching portion of the canvas top rear end portion, that is, a gap S (see FIG. 8) between the tip end portion 15a on the vehicle outside of the garnish 15 and the gate filler 13 is closed by the hook and the flap 11. Therefore, the flow of water or other liquids through this gap S can be shut off, and water 23 flowing down from the upside along the fastener 18 and the canvas 6a or water (not shown) going up from the lower side of the vehicle body can be prevented from entering the cabin side. In particular, the water 23 or other liquids flowing down along the fastener 18 go through on the flap 11 and flow to the vehicle outside as indicated by the broken line in FIG. 8, so that inflow of water or other liquids into the cabin can be avoided. Also, since the canvas 6a is fixed by using the flap 11 provided with the hook 10, a positional shift of the rearsend portion of the canvas top 4 can be prevented, and also the work efficiency for assembling the canvas top 4 can be increased. Also, the lower end portion of the canvas 6a is fixed by engaging the hooks 10 and 21 with the engagement grooves 17 and 22 in the garnish 15, respectively, and accordingly the canvas 6a is subjected to a downward pulling force, so that the occurrence of wrinkles on the canvas top (especially, the canvas 6a portion) can be prevented, and the appearance of the canvas top 4 can be improved.

FIGS. 10 to 14 show a structure for attaching the front end portion of the canvas top 4. By engaging a retainer 25 attached to the front end portion of the canvas 6a constituting the depending portion 6 of the top deck 7 with a garnish 27 (see FIG. 12) attached to a vehicle body 26, the top deck 7 is attached to the vehicle body 26 side. In this embodiment, since the front end portion of the top deck 7 is engaged with the garnish 27 on the vehicle body 26 side, the retainer 25 attached to the canvas 6a along the front end portion of the top deck 7 is divided at a portion corresponding to a joining portion (lap portion) P of the top deck 7 and the side window 9 (see FIG. 10). Therefore, at the front end portion of the ceiling portion 5 of the top deck 7, a retainer portion 25a extending in the transverse direction is disposed at the front end portion of the body of the ceiling portion 5, and a short retainer portion 25b is disposed at the front end portion of the side portion M depending so as to turn to the side downward at the right and left side portions of the aforesaid body. The retainer portion 25a and the retainer portion 25b are disposed as members independent of each other. Thus, these retainer portions 25a and 25b are engaged separately (independently) with an engagement groove 28 in the garnish 27 attached to the vehicle body 26, by which the front end portion of the top deck 7 is attached to the vehicle body 26 side. When the retainer portion 25b, which is the side portion of the divided retainer, is engaged with the vehicle body 26, a side portion M at the front edge of the ceiling portion 5 of the top deck 7 and a upper end portion N at the front edge of the side window 9 are lapped on each other at the joining portion P (see FIGS. 10 and 11).

Figure 14:
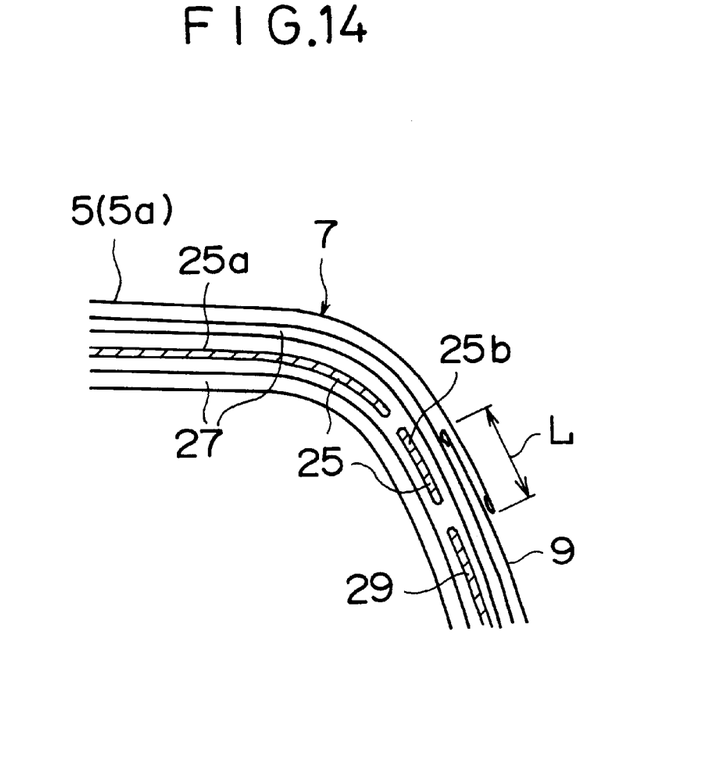
FIG. 14 is an enlarged sectional view taken along the line D—D of FIG. 13.

On the other hand, a retainer 29 is disposed at the front end portion of the side window 9. By engaging this retainer 29 with the engagement groove 28 in the garnish 27, the front end portion of the side window 9 is attached to the vehicle body 26 as shown in FIG. 14. Although not shown in the figure, the canvas 9a of the side window 9 and the canvas 6a of the depending portion 6 of the top deck 7 are connected to each other with a fastener at an appropriate portion.

According to this attaching structure for the canvas top front end portion, since the retainer 25 is divided into the retainer portions 25a and 25b as described above, the retainer portion 25b at the side can be assembled to the engagement groove 28 in the garnish 27 after the side window 9 is mounted to the vehicle body 26. Specifically, after the retainer portion 25a is engaged with the engagement groove 28 in the garnish 27 to assemble the top deck 7 to the vehicle body 26, the side window 9 is assembled to the vehicle body 26, and then the retainer portion 25b, which has been attached to the side portion M of the ceiling portion 5 of the top deck 7 can easily be engaged with the engagement groove 28 in the garnish 27 singly. Therefore, the work efficiency for assembling the canvas top 4 can be increased. Moreover, by making a lap length (lapping amount) L of the side portion M of the ceiling portion 5 of the top deck 7 and the upper end portion N of the side window 9 large, wind noise generated at the time of vehicle running can be restrained, and also the entrance of water or other liquids through these portions can be prevented.

Although one embodiment of the present invention has been described above, the present invention is not limited to this embodiment, and various modifications and changes can be made on the basis of the technical concept of the present invention. For example, although the hook 10 and the retainer portions 25a and 25b are engaged with the engagement grooves 17 and 28 in the garnishes 15 and 27, respectively, in the above-described embodiment, the hook 10 and the retainer portions 25a and 25b may be engaged with a vehicle body portion other than the garnishes 15 and 27.

As described above, the present invention provides a canvas top attaching structure characterized in that a flap provided with a hook is attached to the rear end portion of a canvas covering an open portion of an automobile, and the rear end portion of the canvas is attached to a vehicle body in a state in which the hook is engaged with an engagement portion provided on the vehicle body side. Therefore, a gap (passage) permitting communication between the vehicle outside and the vehicle inside, which lies at the attaching portion of the canvas top rear end portion, can be covered by the hook and the flap, so that the entrance of water or other liquids into the vehicle inside from the vehicle outside can be prevented. Further, since the rear end portion of the canvas top is fixed by using the hooked flap, a positional shift of the rear end portion of the canvas top can be prevented, and also the work efficiency for assembling the canvas top can be increased. Also, since the canvas is fixed by engaging the hook with the vehicle body, the occurrence of wrinkles on the canvas can be prevented, by which the appearance of the canvas can be improved.

Also, in the present invention, the flap is disposed at a portion corresponding to a fastener provided at the rear end portion of the canvas. Therefore, water flowing along the fastener, which connects the canvas of the top deck and the canvas of the rear window to each other, flows on the flap and is discharged to the vehicle outside, so that the entrance of water or other liquids into the vehicle inside can be prevented.

Also, the present invention provides a canvas top attaching structure having at least a top deck for covering an upper portion of an open portion of an automobile and side windows attached to the side of the top deck, in which a retainer attached to the front edge of a canvas constituting the top deck is engaged with a vehicle body to attach the top deck to the vehicle body, characterized in that the retainer is divided at a portion corresponding to a joining portion of the top deck and the side window. Therefore, after the top deck is attached to the vehicle body by using the retainer at the body of a ceiling portion of the top deck to assemble the side window to the top deck, the divided retainer at the side of the aforesaid body can be engaged with the vehicle body, by which the work efficiency for assembling the canvas top can be increased.

Also, in the present invention, when the side portion of the divided retainer is engaged with the vehicle body, the side portion at the front edge of the ceiling portion of the top deck and the upper end portion at the front edge of the side window are lapped on each other. Therefore, by sufficiently securing a lap length of the top deck and the side window, wind noise generated at the time of vehicle running can be restrained, and also the entrance of water or other liquids through the joining portion of the top deck and the side window can be prevented.

What is claimed is:

1. A canvas top attaching structure having at least a top deck for covering an upper portion of an open portion of an automobile and side windows attached to the side of said top deck, in which a retainer attached to the front edge of a canvas constituting said top deck is engaged with a vehicle body to attach said top deck to said vehicle body, characterized in that said retainer is divided at a portion corresponding to a joining portion of said top deck and said side window.

2. The canvas top attaching structure according to claim 1, wherein when the side portion of said divided retainer is engaged with said vehicle body, the side portion at the front edge of a ceiling portion of said top deck and the upper end portion at the front edge of said side window are lapped on each other.

* * * * *